United States Patent
Moser et al.

(10) Patent No.: US 10,371,498 B2
(45) Date of Patent: Aug. 6, 2019

(54) LINEAR INDUCTIVE POSITION SENSOR FOR AN ANGLE MEASUREMENT OF A MECHANICAL COMPONENT IN ROTATION

(71) Applicants: CONTINENTAL AUTOMOTIVE FRANCE, Toulouse (FR); CONTINENTAL AUTOMOTIVE GmbH, Hannover (DE)

(72) Inventors: Andreas Moser, Villeneuve-Tolosane (FR); Alain Fontanet, Muret (FR); Simon-Didier Venzal, Toulouse (FR)

(73) Assignees: CONTINENTAL AUTOMOTIVE FRANCE, Toulouse (FR); CONTINENTAL AUTOMOTICE GMBH, Hannover (DE)

( * ) Notice: Subject to any disclaimer, the term of this patent is extended or adjusted under 35 U.S.C. 154(b) by 255 days.

(21) Appl. No.: 15/595,157

(22) Filed: May 15, 2017

(65) Prior Publication Data

US 2017/0336192 A1  Nov. 23, 2017

(30) Foreign Application Priority Data

May 18, 2016 (FR) ..................... 16 54393

(51) Int. Cl.
*G01B 7/30* (2006.01)
*G01B 7/00* (2006.01)
(Continued)

(52) U.S. Cl.
CPC .............. *G01B 7/30* (2013.01); *G01B 7/003* (2013.01); *G01D 5/20* (2013.01); *G01D 5/2053* (2013.01); *H01F 19/04* (2013.01)

(58) Field of Classification Search
CPC . G01B 7/00; G01B 7/003; G01B 7/30; G01D 5/12–2525; H01F 19/04
See application file for complete search history.

(56) References Cited

U.S. PATENT DOCUMENTS

| 6,756,779 B2* | 6/2004 | Gleixner | G01D 5/2073 324/207.12 |
| 7,508,197 B1* | 3/2009 | Rakov | G01B 7/30 324/207.25 |

(Continued)

FOREIGN PATENT DOCUMENTS

| EP | 1 087 218 A1 | 3/2001 |
| EP | 2 420 803 A1 | 2/2012 |

(Continued)

OTHER PUBLICATIONS

FR Search Report, dated Jan. 10, 2017, from corresponding FR application.

*Primary Examiner* — Huy Q Phan
*Assistant Examiner* — David B Frederiksen
(74) *Attorney, Agent, or Firm* — Young & Thompson

(57) ABSTRACT

Disclosed is a linear inductive sensor having, on the one hand, a fixed part of transformer type with a primary circuit and at least two secondary circuits, the primary circuit being flowed through by a high-frequency alternating current capable of inducing an electrical voltage in each of the at least two secondary circuits and, on the other hand, a moving part with a target intended to be fixed on a mechanical component executing a movement in rotation about an axis, which the inductive sensor measures angularly. The target is a metal spiral carried by a circular face of a ring having a central recess, the ring being intended to be fixed on the component while being concentric therewith, the spiral projecting axially from the ring while making at least one revolution around and moving away from the recess.

20 Claims, 3 Drawing Sheets

(51) Int. Cl.
*G01D 5/20* (2006.01)
*H01F 19/04* (2006.01)

(56) References Cited

U.S. PATENT DOCUMENTS

| | | | | |
|---|---|---|---|---|
| 2008/0012554 A1* | 1/2008 | Babin | .................. | G01D 5/2013 |
| | | | | 324/207.25 |
| 2008/0174302 A1* | 7/2008 | Lee | ...................... | G01D 5/2046 |
| | | | | 324/207.16 |
| 2009/0021243 A1* | 1/2009 | Schunk | .................. | G01P 3/488 |
| | | | | 324/173 |
| 2010/0188104 A1* | 7/2010 | Speckmann | ........... | G01D 5/202 |
| | | | | 324/656 |
| 2011/0181302 A1* | 7/2011 | Shao | .................... | G01D 5/2225 |
| | | | | 324/654 |
| 2012/0041691 A1 | 2/2012 | Fericean et al. | | |
| 2014/0167788 A1 | 6/2014 | Fontanet | | |
| 2015/0204740 A1 | 7/2015 | Fericean et al. | | |
| 2018/0274591 A1* | 9/2018 | Maniouloux | ........... | G01P 3/443 |

FOREIGN PATENT DOCUMENTS

| | | |
|---|---|---|
| FR | 3 023 611 A1 | 1/2016 |
| JP | S54 82260 A | 6/1979 |
| JP | 2006 313121 A | 11/2006 |

\* cited by examiner

LINEAR INDUCTIVE POSITION SENSOR FOR AN ANGLE MEASUREMENT OF A MECHANICAL COMPONENT IN ROTATION

FIELD OF THE INVENTION

The invention relates to a linear inductive position sensor for an angle measurement of a mechanical component in rotation. In one such configuration, the linear position sensor achieves the function generally fulfilled by a rotary sensor, which it then replaces.

BACKGROUND OF THE INVENTION

Any type of inductive sensor, whether linear or rotary, has the advantage of making it possible to determine the position of a mechanical component, or any other element, without requiring contact with the component whose position it is desired to know. This advantage means that the applications of such sensors are very numerous types of industry. Such sensors are also used in in all consumer applications, for example in the automotive sector, in which the present invention has been made. It may, however, be used in other diverse and varied fields.

There are principally three types of inductive sensor. The first type of sensor relates to linear inductive sensors by which a translational movement of a mechanical component is measured. The second type of sensor relates to rotary inductive sensors, which follow a rotational movement of a mechanical component about an axis, these rotary inductive sensors also been referred to by the term resolver. The term resolver relates to a position sensor which is furthermore capable of taking the measurement even at a high rotational speed. A third type of sensor relates to sensors capable of carrying out a linear as well as rotary measurement function, among which are sensors marketed under the brand name Inductosyn®.

A contactless inductive sensor is a position sensor the principle of which is based on variation of the coupling between the primary and the secondaries of a transformer operating at high frequency and without a magnetic circuit. Such a sensor therefore comprises a fixed part of transformer type with a primary circuit and at least two secondary circuits, the high-frequency alternating current being capable of inducing an electrical voltage in each of said at least two secondary circuits. It is possible for the transformer to simply be a printed circuit on which the primary and secondaries are formed by tracks inscribed on this printed circuit.

The coupling varies as a function of the position of a moving conductive component, which is the seat of induced currents and the position of which with respect to the transformer it is desired to know precisely, this component forming the second part, this second part being the only moving part of the inductive sensor and being referred to as the target. The inductive sensor is referred to as being contactless because there is no contact between the fixed and moving parts of the inductive sensor.

The primary circuit is supplied by an external source varying as a function of time at high frequency, and the secondary circuits are the seat of induced voltages. The conductive target whose position it is desired to know generally has a simple shape. For a linear sensor designed to measure a translational movement of a mechanical component, the target has a parallelepipedal shape, and for a rotary sensor the target comprises an angular sector with a given angle. The dimensions of each of these targets, as well as the elements of the primary circuit and secondary circuits, must be selected in order to optimize the characteristics of the specifically linear or rotary sensor.

The fluxes of the secondaries, divided by the flux of the primary, form, as a function of the position of the target, envelopes of precise values with a given amplitude, which are independent of time. The values of the fluxes of the secondaries and of the primary are advantageously set up to produce sine and cosine functions of the position of the target over the entire travel of the sensor.

These sine and cosine functions are very useful in the electronic processing of the sensor. The ratio of the two functions is calculated before taking the arctangent, the result of the arctangent thus giving an image of the position of the target. The argument of the sine and cosine functions is a linear or affine function of the position of the target. Thus, the travel of the target represents a more or less large part of the spatial period of these trigonometric functions. The behavior of this sensor is therefore identical to that of a transformer with an emitting primary winding and two secondary windings. From a physical point of view, the modification of the coupling of the primary with the secondaries takes place by means of the electromagnetic skin effect.

Since the primary is supplied with high frequency, the phenomena occurring in the sensor are therefore all at high frequency. The target, which is a solid conductive component, is therefore the seat of large induced currents. The penetration depth of these induced currents is given by the conventional formula for the skin depth. In view of the fact that the calculation gives a value of 50 µm for aluminum, which is a favored but nonlimiting material for the target, the induction therefore penetrates almost not at all into the target. The magnetic flux produced by the primary therefore goes around the target. This greatly modifies the field lines. This modification is seen by the secondaries, which receive more or less flux depending on the position of the target. These fluxes which are variable depending on the target are also variable as a function of time. They therefore generate a voltage across the terminals of the secondary circuits, which is measured by the electronics. The sensor therefore measures the position of the target as a function of the fluxes received in the secondary circuits.

Document US-A-2014/167788 describes a rotary inductive sensor for measuring the angular position of a mechanical component in rotary movement, having a primary winding associated with at least one secondary winding, and a target attached to the component in rotation about a central axis. The primary winding is centered around an axis coinciding with the central axis of rotation of the target, and is flowed through by a high-frequency alternating current capable of inducing an electrical voltage in each secondary winding. The target consists of a plurality of angular sectors with the same angular aperture, which are distributed evenly at one end of the mechanical component in rotary movement.

It is known that inductive sensors, particularly rotary inductive sensors, in which the value measured for the target is an angle, exhibit errors in the measurement of the angular position of the target, therefore of the mechanical component in rotary movement. In this document, it is proposed to reduce the angular aperture of each angular sector of the target by an adjustment angular sector, in order to eliminate one order of the harmonics in a Fourier expansion of the deviation from linearity. This requires a transformation of the complicated angular sectors and only partially solves the problem of the errors in the angular position measurement of the target for a rotary inductive sensor.

Furthermore, the target of the rotary inductive sensor is frequently positioned at one of the two ends of the mechanical component, which is often in the form of a shaft. Particularly in the field of motor vehicles, it is common that the two ends of such a shaft are fixed to other components and cannot accommodate the angular sectors of the target.

SUMMARY OF THE INVENTION

The problem underlying the present invention is to configure a linear inductive sensor having a fixed part and a moving target in order to measure the angular position of a mechanical component in rotary movement instead of a rotary inductive sensor, the linear inductive sensor, and above all its target, being capable of being placed at various positions in relation to the mechanical component in rotation, and not only at one end of the component.

To this end, the present invention relates to a linear inductive sensor having, on the one hand, a fixed part of transformer type with a primary circuit and at least two secondary circuits, the primary circuit being flowed through by a high-frequency alternating current capable of inducing an electrical voltage in each of said at least two secondary circuits and, on the other hand, a moving metal part carrying a target intended to be fixed on a mechanical component executing a movement in rotation about a central axis, which the inductive sensor measures angularly, which is noteworthy in that the target is in the form of a metal spiral carried by a circular face of a ring having a central recess, the ring being intended to be fixed on the mechanical component while being concentric with the mechanical component, the metal spiral projecting axially from the ring while making at least one revolution around the central recess as it moves away from the central recess.

A linear sensor measures a linear movement. Nevertheless, the present invention makes it possible to transform a rotational movement, i.e. that of a rotating mechanical component, into an apparently linear movement. This is done by means of a spiral arranged on a circular planar face of a ring. With a spiral, the rotational movement is tracked like that of a surface which moves radially over the ring.

The effect of using a spiral is that the rotational movement of the mechanical component is tracked by being transformed into a linear movement of the target, i.e. for a given revolution a succession of different portions of the spiral pass in front of the sensor in a movement similar to a linear movement. The fixed part of the inductive sensor then measures the position of the portion of the spiral which lies in front of it at a given time.

The main advantage of the present invention is the obtention of a compact inductive sensor allowing absolute measurement of the rotational angle of a mechanical component in rotation, for example a shaft. The principle of this linear sensor may be used to make it into an angular speed sensor of the ring, and therefore of the mechanical component, i.e. to allow it to be used in a manner equivalent to an angular sensor or resolver.

It is possible to place the ring, and therefore the target, at any position on the periphery of the mechanical component, and not only at its ends. It is even possible to use a ring-shaped element, for example a collar, already present on the mechanical component. The problem of the lack of space at the ends of a mechanical component whose rotational movement is being monitored is thus solved, while offering a wide range of possible positions of the ring on the mechanical component.

Advantageously, the spiral has a first end close to the central recess of the ring, the spiral terminating in a second end furthest away from the central recess, a radial distance between the first and second ends of the spiral corresponding approximately to the length of the fixed part of the sensor, in which the primary circuit and secondary circuits extend.

The larger and wider the spiral is, the more the sensor will process signals of the secondary circuits which are strong and therefore more usable. The smaller the spiral is, the more the target will have a small size and less mass, with the disadvantage of creating weaker signals than signals obtained with a large wide spiral. The choice of the spiral depends on whether the lightness of the target or the processing of the signals is favored. Compromise solutions are of course possible.

Advantageously, the fixed part is arranged facing and at a distance from the circular surface of the ring carrying the spiral, the fixed part extending parallel to a radius of the ring. The secondary circuits, advantageously extending along the length of the fixed part, are then in a suitable position so that their signals which they emit make it possible to detect the passage of a part of the spiral forming a target over a portion of these circuits.

Advantageously, the spiral has a working portion capable of interacting with the fixed part for the angle measurement of the mechanical component, this working portion extending over the majority of the length of the spiral except for two end portions, the maximum width of the working portion of a spiral capable of being carried by the circular face of the ring being at most equal to half the length of the fixed part of the sensor, and the minimum width of the working portion of a spiral capable of being carried by the circular face of the ring being at least equal to slightly less than one quarter of the length of the fixed part. This is related to the arrangement of coils in the secondary circuits, secondary circuits respectively emitting a sine or cosine signal by having specific successions of coils. It is therefore possible to select a spiral from among spirals with different configurations for a given ring.

Advantageously, the working portion of the spiral carried by the circular face of the ring has a constant width or a width varying over this working portion between half the length of the fixed part of the sensor and up to slightly less than one quarter of this length.

Advantageously, one secondary circuit of said at least two secondary circuits generates a cosine signal by having at least one unit of three coils with a central coil of large size enclosed by two small lateral coils, the two small coils being mounted in phase opposition with the large coil, the large coil having a length two times that of each small coil, and another secondary circuit generates a sine signal by having at least one unit of two coils with equivalent sizes and mounted in phase opposition.

Advantageously, said at least one unit of two coils of one secondary circuit and said at least one unit of three coils of another secondary circuit extend lengthwise along the length of the fixed part, the primary circuit and said at least two secondary circuits being superimposed with one another.

Advantageously, said at least two secondary circuits have a plurality of units of coils, the units of coils of a given circuit being aligned along the length of the fixed part with a longitudinal offset in each case.

Advantageously, the spiral is made of machined or molded aluminum. Aluminum is a material which is a good conductor, lightweight, easy to machine and of low cost. Furthermore, aluminum resists corrosion well.

The invention also relates to an assembly comprising a mechanical component and a linear inductive sensor, the mechanical component executing a movement in rotation about a central axis and the linear inductive sensor angularly measuring the movement of the component in rotation, which is noteworthy in that the linear inductive sensor is as mentioned above, the ring of the moving part of the sensor being fixed on the mechanical component while being radial and concentric with the mechanical component, the mechanical component passing through the ring via the central recess of the ring.

Advantageously, the mechanical component is of cylindrical shape while having two circular ends separated by a curved lateral surface, the ring being fixed on the curved lateral surface at a distance from the two circular ends, the fixed part of the sensor being inserted into the space delimited by the circular face of the ring carrying the spiral and one circular end of the cylindrical component, the fixed part of the sensor extending radially with respect to the mechanical component and at a distance from the mechanical component.

Specifically, the preferred but nonlimiting application of the present invention is for a rotating shaft as mechanical component, this shaft being cylindrical. This shaft is advantageously a driven shaft, more particularly a shaft driven by an electric motor, the presence of an inductive sensor associated with the shaft making it possible to slave the electric motor and the shaft.

Lastly, the invention relates to a motor vehicle having at least one rotating shaft provided with a linear inductive sensor, which is noteworthy in that said at least one rotating shaft, as mechanical component, and the inductive sensor form an assembly as described above.

BRIEF DESCRIPTION OF THE DRAWINGS

Other characteristics, objects and advantages of the present invention will become apparent on reading the following detailed description and in the light of the appended drawings, which are given by way of nonlimiting examples and in which.

DETAILED DESCRIPTION OF THE INVENTION

It should be borne in mind that the figures are given by way of examples and do not limit the invention. They are basic schematic representations intended to facilitate understanding of the invention, and are not necessarily to the scale of the practical applications. In particular, the dimensions of the various elements illustrated are not representative of reality.

Figure 1:
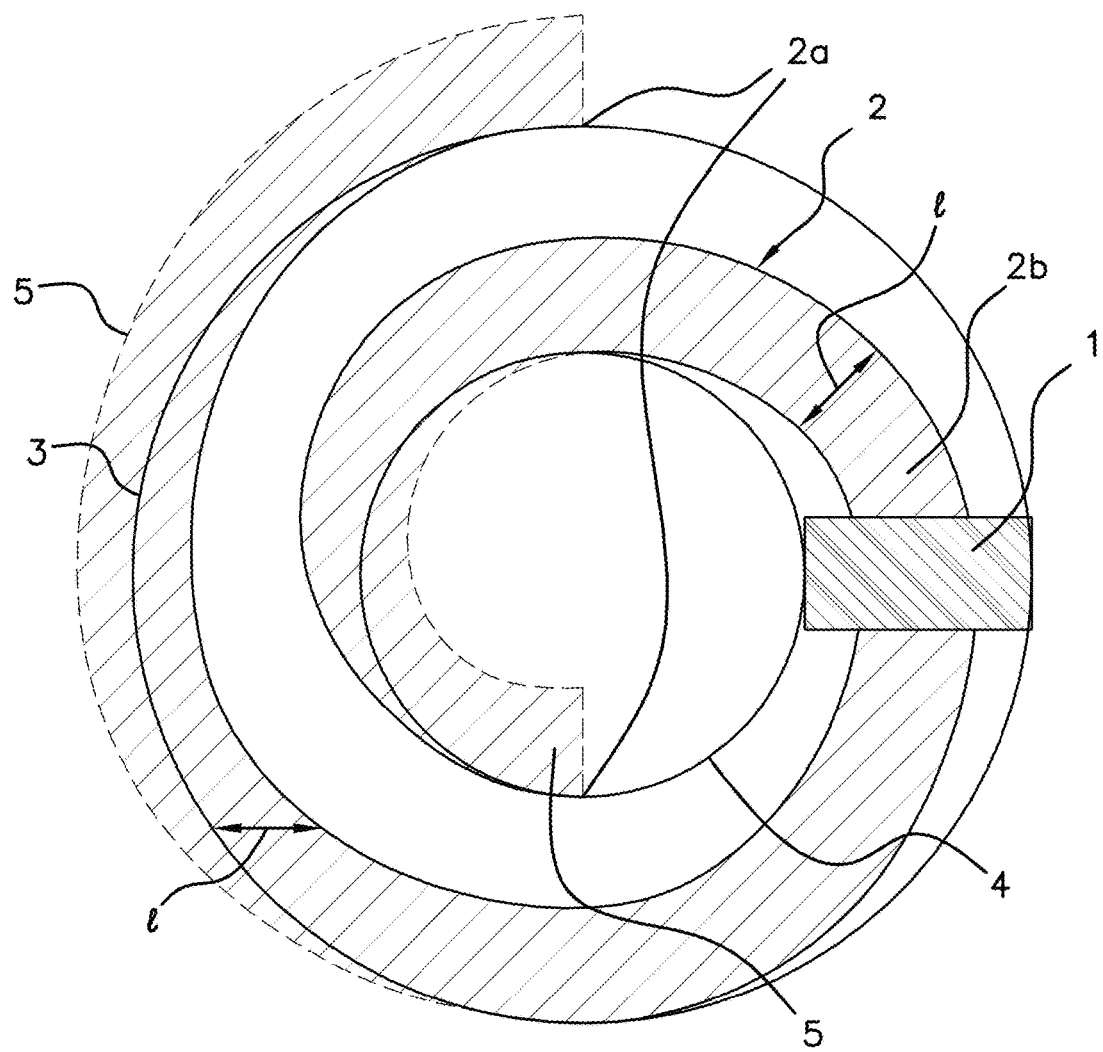
FIG. 1 is a schematic representation of a front view of a ring carrying a target in the form of a relatively large spiral according to a first embodiment of the present invention.
Figure 2:
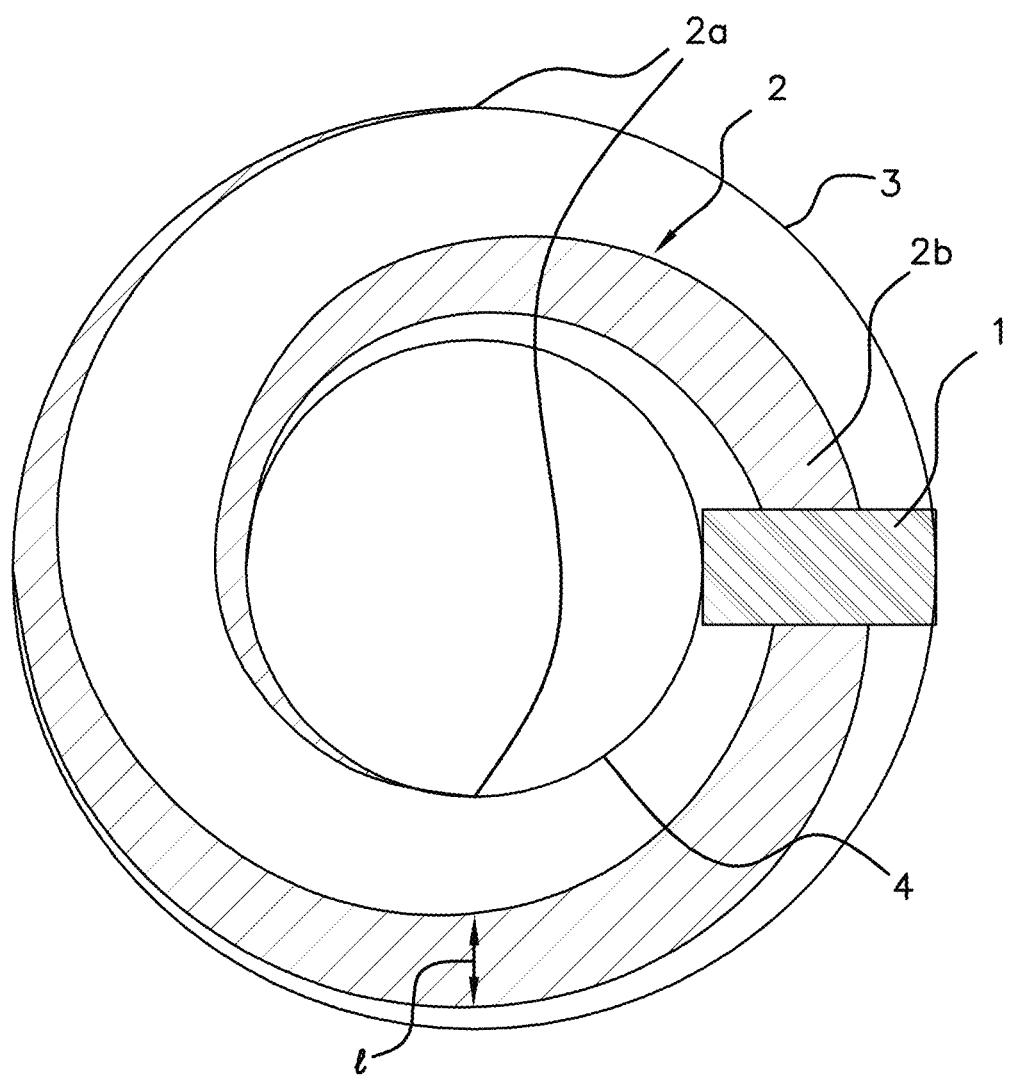
FIG. 2 is a schematic representation of a front view of a ring carrying a target in the form of a relatively small spiral according to a second embodiment of the present invention, FIG. 3 it is a schematic representation of an embodiment of the primary circuit and of two secondary circuits in the fixed part of an inductive sensor, this embodiment of the circuits being usable in an inductive sensor according to the present invention.

For example, in FIGS. 1 and 2, the spiral forming the target is wound between the central recess and the outer periphery of the ring and may even overhang this ring in FIG. 1, an overhang being in no case essential for the spiral according to the present invention. Such winding of the spiral is not limiting and it is possible for the spiral not to join with the central recess and/or the outer periphery. In the event of an overhang of the spiral outside the ring, the overhang width shown by dashes in FIG. 1 is not limiting. In FIGS. 1 and 2, the spiral has tapered ends, which is not limiting either. The width of the spiral may or may not be constant over the largest portion of the spiral.

The positioning of the fixed part of the sensor with respect to the ring and to the spiral shown in FIGS. 1 and 2 is not limiting either, what is important being that a different spiral portion is arranged aligned with the fixed part for a time during the rotation of the component whose angular movement is to be measured. In FIG. 2, the fixed part of the sensor is mounted slightly overhanging in the central recess and from the outer periphery of the ring, which is not obligatory and even not preferred in some configurations.

In what follows, reference will be made to all the figures taken in combination. When reference is made to one or more specific figures, these figures are to be taken in combination with the other figures in order to identify the numerical references designated.

Referring in particular to FIGS. 1 and 2, the present invention relates to a linear inductive sensor 1 to 3 having, on the one hand, a fixed part 1 of transformer type and, on the other hand, a moving part 2, 3 used as a target. This inductive sensor may be used in a motor vehicle on at least one rotating shaft present in the vehicle and is provided with a linear inductive sensor, which is not limiting.

Figure 3:
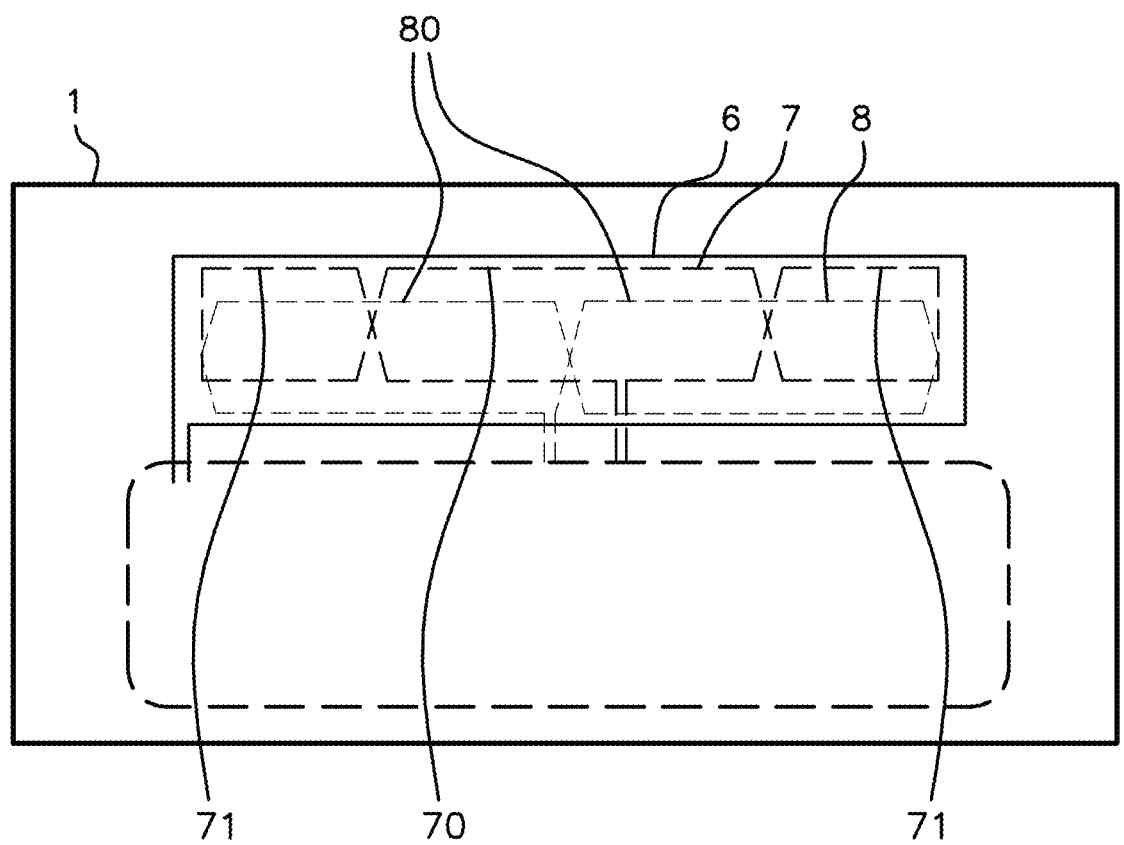

As can be seen in FIG. 3, the fixed part 1 of the inductive sensor 1 to 3 has a primary circuit 6 and at least two secondary circuits 7, 8. The primary circuit 6 is flowed through by a high-frequency alternating current capable of inducing an electrical voltage in each of said at least two secondary circuits 7, 8.

The moving part 2, 3 has a metal target 2 intended to be fixed on a mechanical component executing a movement in rotation about a central axis, which the inductive sensor 1 to 3 measures angularly. According to the invention, it is sought to position the target on the component at multiple positions of the component and not at one of its ends 2a, such ends 2a frequently being attached to other elements, often making it impossible to place the target at an end of the component.

In order to do this, the target is in the form of a metal spiral 2 carried by a circular face of a ring 3 having a central recess 4, the ring forming the rest of the fixed part 2, 3. The ring 3 is intended to be fixed on the mechanical component while being concentric with the mechanical component, the metal spiral 2 projecting axially from the ring 3 while making at least one revolution around the central recess 4 as it moves away from the central recess 4.

FIGS. 1 and 2 show two embodiments of the spiral 2, namely a relatively large spiral 2 in FIG. 1 and a relatively small spiral 2 in FIG. 2. In these two embodiments, the spiral 2 may have a first end 2a close to the central recess 4 of the ring 3 but not necessarily adjacent to this central recess 4. In FIG. 2, for example, the spiral 2 may make a quarter turn while being adjacent to the central recess 4, while in FIG. 1 the spiral 2 makes more than a quarter turn and less than a half turn.

The spiral 2 may terminate in a second end 2a furthest away from the central recess 4 but not necessarily adjacent to or overhanging the outer periphery of the ring 3. In the case of a spiral 2 overhanging the outer periphery of the ring 3, as shown in FIG. 1, the overhanging parts 5 are of no use in terms of the measurement of angular movement of the component carrying the ring 3. On the other hand, this makes its production and/or attachment to the ring 3 easier. It is therefore in practice only for manufacturing reasons that a large spiral 2 overhanging the outer periphery of the ring 3 may be provided.

The radial distance between the first and second ends 2a of the spiral 2 may correspond approximately to the length of the fixed part 1, in which the primary circuit 6 and secondary circuits 7, 8 extend, of the sensor 1 to 3. As can be seen in FIGS. 1 and 2, it is possible that the first and second ends 2a of the spiral 2 are not aligned radially, although it is also possible that they are. In the first case, the radial distance is therefore taken between a first point lying on the circle concentric with the ring 3 and passing through an end 2a of the spiral 2, and a second point lying on the circle concentric with the ring 3 and passing through an end 2a of the spiral 2, the first and second points being aligned radially and therefore carried by one and the same radius of the ring 3.

The fixed part 1 may be arranged facing and at a distance from the circular surface of the ring 3 carrying the spiral 2, the fixed part 1 extending parallel to a radius of the ring 3, and therefore radially with respect to the ring 3. There is an interval between the fixed part 1 and the spiral 2. The larger this interval between the fixed part 1 of the sensor 1 to 3 and the target 2 is, the greater the thickness of the spiral 2 may be, the latter being taken in the direction in which the spiral 2 protrudes from the ring 3. The same may be true for its width I. The width I of the spiral 2 refers to the width of the branch of the spiral 2, and not to the total width the spiral 2 occupies on the ring 3, it being possible for this total width to contain a plurality of branches of the spiral 2 as well as the distance between branches.

The spiral 2 may have a working portion capable of interacting with the fixed part 1 for the angle measurement of the mechanical component. This working portion 2b may extend over the majority of the length of the spiral except for two end portions 2a, these two end portions advantageously being tapered. Since it is possible to select the spiral 2 carried by the circular face of the ring 3 from different types of spiral, the maximum width of the working portion 2b of a spiral 2 capable of being carried by the circular face of the ring 3, that is to say the maximum width which a branch of the spiral occupies in the working portion 2b, may be at most equal to half the length of the fixed part 1 of the sensor 1 to 3. The minimum width of the working portion 2b of a spiral 2 capable of being carried by the circular face of the ring 3 may be at least equal to slightly less than one quarter of the length of the fixed part 1.

It is therefore conceivable to select a spiral 2 to be attached to a ring 3 in order to form a target from among spirals with working portions 2b of different widths for the spirals with respect to one another, so long as this advantageous condition is complied with.

For a given selected spiral 2, the working portion 2b of the spiral 2 carried by the circular face of the ring 3 may have a constant width I, i.e. the width which a branch of the spiral 2 occupies in this working portion 2b. As an alternative, the working portion 2b of the spiral 2 carried by the circular face of the ring 3 may have a width I varying over this working portion 2b between half the length of the fixed part 1 of the sensor and up to slightly less than one quarter of this length.

In FIG. 2, the spiral may be considered as being of constant width over the majority of its length. The majority of the spiral 2 is intended to lie facing the fixed part 1 of the inductive sensor 1 to 3. The ends 2a of the spiral 2 often lie outside the useful surface of the sensor 1 to 3.

The spiral 2 is made of a material which is a good conductor of electricity. Among these materials, aluminum is preferred. The attachment of the spiral 2 to the ring 3 requires great precision. A plurality of manufacturing methods may be employed, for example by machining or molding. Providing the spiral 2 with a part 5 overhanging the ring 3 may be advantageous for positioning it on the ring 3.

To give an idea, the travel of the spiral 2 taken between its two ends 2a may be 24 mm, and the fixed part 1 of the sensor 1 to 3 may be 326 mm long and from 10 to 15 mm thick.

The invention also relates to an assembly comprising a mechanical component and a linear inductive sensor 1 to 3, the mechanical component executing a movement in rotation about a central axis and the linear inductive sensor 1 to 3 angularly measuring the movement of the component in rotation. The linear inductive sensor 1 to 3 is as mentioned above, the ring 3 of the moving part of the sensor 1 to 3 being fixed on the mechanical component while being radial and concentric with the mechanical component, the mechanical component passing through the ring 3 via the central recess 4 of the ring 3. The size of the central recess 4 is therefore selected according to the mechanical component.

As mentioned above, it is possible to use a ring-shaped part of the mechanical component, if there is one, as the support of the target in the form of a spiral in order to produce the moving part of the inductive sensor 1 to 3.

The mechanical component is often of cylindrical shape while having two circular ends separated by a curved lateral surface, it being possible for this mechanical component to be an axle or a transmission shaft, especially but not only in the automotive sector.

In the case of a cylindrical mechanical component, the ring 3 may be fixed on the curved lateral surface of the mechanical component at a distance from the two circular ends. The fixed part 1 of the sensor 1 to 3 is then inserted into the space delimited by the circular face of the ring 3 carrying the spiral 2 and a circular end of the cylindrical component, the fixed part 1 of the sensor 1 to 3 extending radially with respect to the mechanical component and at a distance from the mechanical component, so as to leave a gap between the fixed part 1 and the spiral 2 forming the target.

In a restriction to the field of means of locomotion, which is not limiting, this mechanical component may be an element fitted onboard a motor vehicle, or more generally any means of transport. In this case, the signals generated by the secondary circuits 7, 8 are supplied by the inductive sensor 1 to 3 to a computer of the vehicle, for example an engine controller, in order to allow in particular slaving of the mechanical component if the mechanical component is being driven by an electric motor.

FIG. 3 shows an embodiment of a fixed part 1 with a primary circuit 6, or emitter circuit, and two secondary circuits 7, 8, or receiver circuits. The fixed part 1 of the inductive sensor 1 to 3 accommodates a printed circuit board having a primary circuit 6 and two secondary circuits 7, 8, which are coupled to the primary circuit 6. The primary circuit 6 and secondary circuits 7, 8 are connected to an electronic module for control and processing of the data fed back by the primary circuit 6 and the secondary circuits 7, 8.

In a known manner, the primary circuit 6 makes it possible to generate a magnetic field when a current flows inside it. The magnetic field created in this way induces a current in the secondary circuits 7, 8. During rotation of the component, the target in the form of a spiral carried by the ring attached to the component, the target, the ring and the mechanical component not being shown in FIG. 3, moves relative to the primary circuit and secondary circuits. The target modifies the magnetic coupling between the primary circuit 6 and the two secondary circuits 7, 8. Furthermore, by measuring the electrical voltages across the terminals of the secondary circuits 7, 8, it is possible to deduce the precise position of the target and therefore the angular position of the mechanical component.

In the presence of the target, the secondary circuits 7, 8 placed in proximity to the target see a smaller quantity of flux of the magnetic field than if the target was absent. The secondary circuits 7, 8 are different from one another. A first secondary circuit 7 is capable of generating a cosine signal during passage of the target, and a second secondary circuit 8 is capable of generating a sine signal during a passage of the target.

The first secondary circuit 7, which generates a cosine signal, has at least one unit of three coils 70, 71 with a central coil of large size 70 enclosed by two small lateral coils 71, the two small coils 71 being mounted in phase opposition with the large coil 70, the large coil 70 having a length two times that of each small coil 71.

The second secondary circuit 8, which generates a sine signal, has at least one unit of two coils 80 with equivalent sizes and mounted in phase opposition. The sine/cosine signals are temporally correlated by the calculation of the arctangent in order to determine the position of the target precisely.

Said at least one unit of two coils 80 of one secondary circuit 8 generating a sine signal and said at least one unit of three coils 70, 71 of another secondary circuit 7 generating a cosine signal may extend lengthwise along the length of the fixed part 1. The primary circuit 6 and said at least two secondary circuits 7, 8 may be superimposed with one another.

The two or more secondary circuits 7, 8 may have a plurality of units of coils, the units of coils of a given circuit being aligned along the length of the fixed part 1 with a longitudinal offset in each case.

The present invention applies to any angular position measurement requiring an inductive technology, for example in the presence of a magnetic field of a motor with a magnet in proximity.

The invention claimed is:

1. Linear inductive sensor (1 to 3) having both a fixed part (1) of transformer type with a primary circuit (6) and at least two secondary circuits (7, 8), the primary circuit (6) being flowed through by a high-frequency alternating current capable of inducing an electrical voltage in each of said at least two secondary circuits (7, 8), as well as a moving part (2, 3) having a metal target (2) intended to be fixed on a mechanical component executing a movement in rotation about a central axis, which the inductive sensor (1 to 3) measures angularly, wherein the target is in the form of a metal spiral (2) carried by a circular face of a ring (3) having a central recess (4), the ring (3) being intended to be fixed on the mechanical component while being concentric with the mechanical component, the metal spiral (2) projecting axially from the ring (3) while making at least one revolution around the central recess (4) as it moves away from the central recess (4).

2. Inductive sensor (1 to 3) according to claim 1, wherein the spiral (2) has a first end (2*a*) close to the central recess (4) of the ring (3), the spiral (2) terminating in a second end (2*a*) furthest away from the central recess (4), a radial distance between the first and second ends (2*a*) of the spiral (2) corresponding approximately to the length of the fixed part (1) of the sensor (1 to 3), in which the primary circuit (6) and secondary circuits (7, 8) extend.

3. Inductive sensor (1 to 3) according to claim 2, wherein the fixed part (1) is arranged facing and at a distance from the circular surface of the ring (3) carrying the spiral (2), the fixed part (1) extending parallel to a radius of the ring (3).

4. Inductive sensor (1 to 3) according to claim 3, wherein the spiral (2) has a working portion (2*b*) capable of interacting with the fixed part (1) for the angle measurement of the mechanical component, this working portion (2*b*) extending over the majority of the length of the spiral (2) except for two end portions (2*a*), the maximum width of the working portion (2*b*) of a spiral (2) capable of being carried by the circular face of the ring (3) being at most equal to half the length of the fixed part (1) of the sensor (1 to 3), and the minimum width of the working portion (2*b*) of a spiral (2) capable of being carried by the circular face of the ring (3) being at least equal to slightly less than one quarter of the length of the fixed part (1).

5. Inductive sensor (1 to 3) according to claim 3, wherein one secondary circuit (7) of said at least two secondary circuits (7, 8) generates a cosine signal by having at least one unit of three coils (70, 71) with a central coil of large size (70) enclosed by two small lateral coils (71), the two small coils (71) being mounted in phase opposition with the large coil (70), the large coil (70) having a length two times that of each small coil (71), and another secondary circuit (8) of said at least two secondary circuits (7, 8) generates a sine signal by having at least one unit of two coils (80) with equivalent sizes and mounted in phase opposition.

6. Inductive sensor (1 to 3) according to claim 3, wherein the spiral (2) is made of machined or molded aluminum.

7. Inductive sensor (1 to 3) according to claim 2, wherein the spiral (2) has a working portion (2*b*) capable of interacting with the fixed part (1) for the angle measurement of the mechanical component, this working portion (2*b*) extending over the majority of the length of the spiral (2) except for two end portions (2*a*), the maximum width of the working portion (2*b*) of a spiral (2) capable of being carried by the circular face of the ring (3) being at most equal to half the length of the fixed part (1) of the sensor (1 to 3), and the minimum width of the working portion (2*b*) of a spiral (2) capable of being carried by the circular face of the ring (3) being at least equal to slightly less than one quarter of the length of the fixed part (1).

8. Inductive sensor (1 to 3) according to claim 7, wherein the working portion (2*b*) of the spiral (2) carried by the circular face of the ring (3) has a constant width (1) or a width (1) varying over this working portion (2*b*) between half the length of the fixed part (1) of the sensor and up to slightly less than one quarter of this length.

9. Inductive sensor (1 to 3) according to claim 8, wherein one secondary circuit (7) of said at least two secondary circuits (7, 8) generates a cosine signal by having at least one unit of three coils (70, 71) with a central coil of large size (70) enclosed by two small lateral coils (71), the two small coils (71) being mounted in phase opposition with the large coil (70), the large coil (70) having a length two times that of each small coil (71), and another secondary circuit (8) of said at least two secondary circuits (7, 8) generates a sine signal by having at least one unit of two coils (80) with equivalent sizes and mounted in phase opposition.

10. Inductive sensor (1 to 3) according to claim 8, wherein the spiral (2) is made of machined or molded aluminum.

11. Inductive sensor (1 to 3) according to claim 7, wherein one secondary circuit (7) of said at least two secondary circuits (7, 8) generates a cosine signal by having at least one unit of three coils (70, 71) with a central coil of large size (70) enclosed by two small lateral coils (71), the two small coils (71) being mounted in phase opposition with the large coil (70), the large coil (70) having a length two times that of each small coil (71), and another secondary circuit (8) of said at least two secondary circuits (7, 8) generates a sine signal by having at least one unit of two coils (80) with equivalent sizes and mounted in phase opposition.

12. Inductive sensor (1 to 3) according to claim 7, wherein the spiral (2) is made of machined or molded aluminum.

13. Inductive sensor (1 to 3) according to claim 2, wherein one secondary circuit (7) of said at least two secondary circuits (7, 8) generates a cosine signal by having at least one unit of three coils (70, 71) with a central coil of large size (70) enclosed by two small lateral coils (71), the two small coils (71) being mounted in phase opposition with the large coil (70), the large coil (70) having a length two times that of each small coil (71), and another secondary circuit (8) of said at least two secondary circuits (7, 8) generates a sine signal by having at least one unit of two coils (80) with equivalent sizes and mounted in phase opposition.

14. Inductive sensor (1 to 3) according to claim 2, wherein the spiral (2) is made of machined or molded aluminum.

15. Inductive sensor (1 to 3) according to claim 1, wherein one secondary circuit (7) of said at least two secondary circuits (7, 8) generates a cosine signal by having at least one unit of three coils (70, 71) with a central coil of large size (70) enclosed by two small lateral coils (71), the two small coils (71) being mounted in phase opposition with the large coil (70), the large coil (70) having a length two times that of each small coil (71), and another secondary circuit (8) of said at least two secondary circuits (7, 8) generates a sine signal by having at least one unit of two coils (80) with equivalent sizes and mounted in phase opposition.

16. Inductive sensor (1 to 3) according to claim 15, wherein said at least one unit of two coils (80) of one secondary circuit (8) and said at least one unit of three coils (70, 71) of another secondary circuit (7) extend lengthwise along the length of the fixed part (1), the primary circuit (6) and said at least two secondary circuits (7, 8) being superimposed with one another.

17. Inductive sensor (1 to 3) according to claim 15, wherein the spiral (2) is made of machined or molded aluminum.

18. Inductive sensor (1 to 3) according to claim 1, wherein the spiral (2) is made of machined or molded aluminum.

19. Assembly comprising a mechanical component and a linear inductive sensor (1 to 3), the mechanical component executing a movement in rotation about a central axis and the linear inductive sensor (1 to 3) angularly measuring the movement of the component in rotation, wherein the linear inductive sensor (1 to 3) is according to claim 1, the ring (3) carrying the spiral (2) being fixed on the mechanical component while being radial and concentric with the mechanical component, the mechanical component passing through the ring (3) via the central recess (4) of the ring (3).

20. Assembly according to claim 19, wherein the mechanical component is of cylindrical shape while having two circular ends separated by a curved lateral surface, the ring (3) being fixed on the curved lateral surface at a distance from the two circular ends, the fixed part (1) of the sensor (1 to 3) being inserted into the space delimited by the circular face of the ring (3) carrying the spiral (2) and one circular end of the cylindrical component, the fixed part (1) of the sensor (1 to 3) extending radially with respect to the mechanical component and at a distance from the mechanical component.

* * * * *